Patented May 25, 1926.

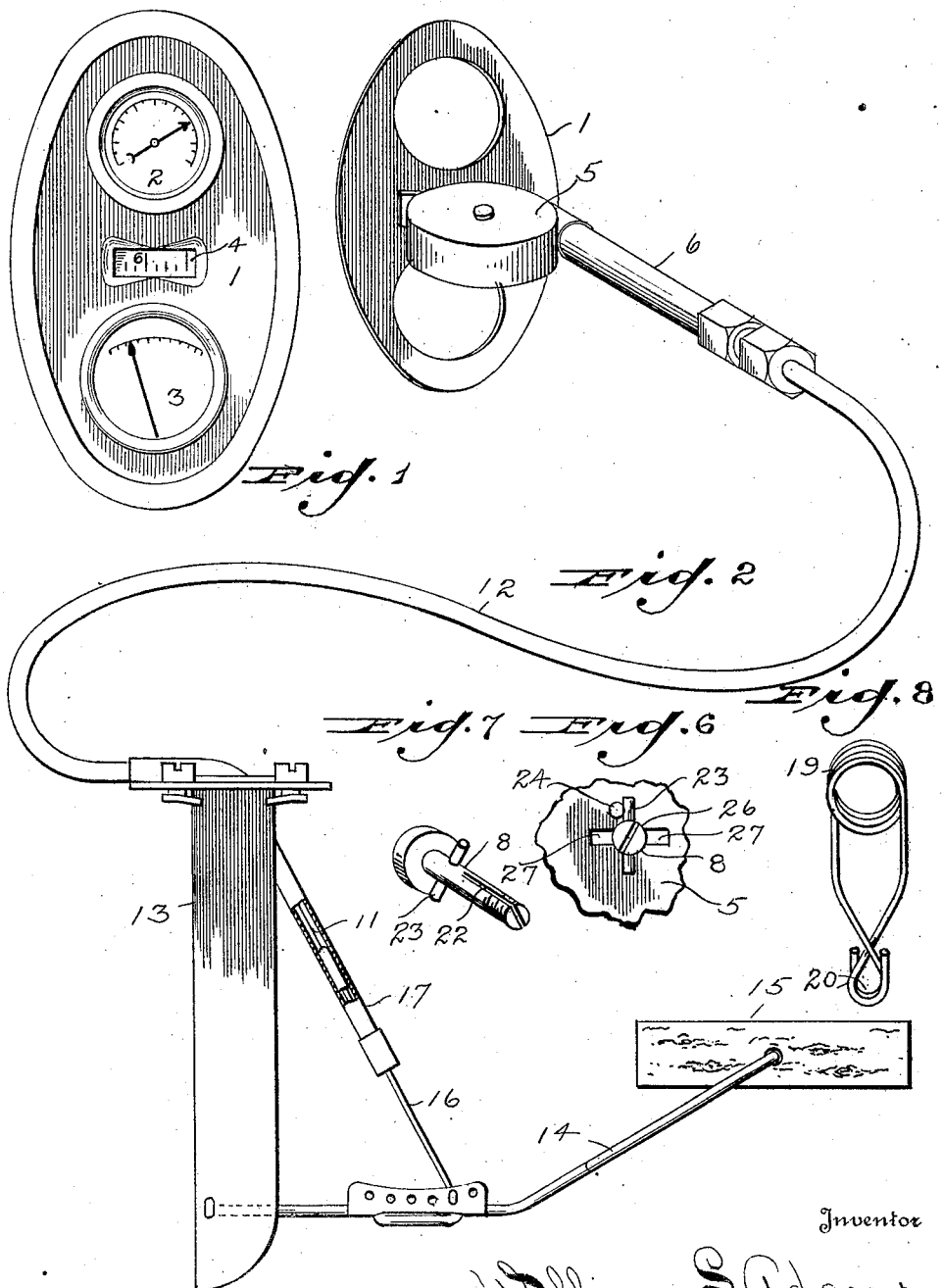

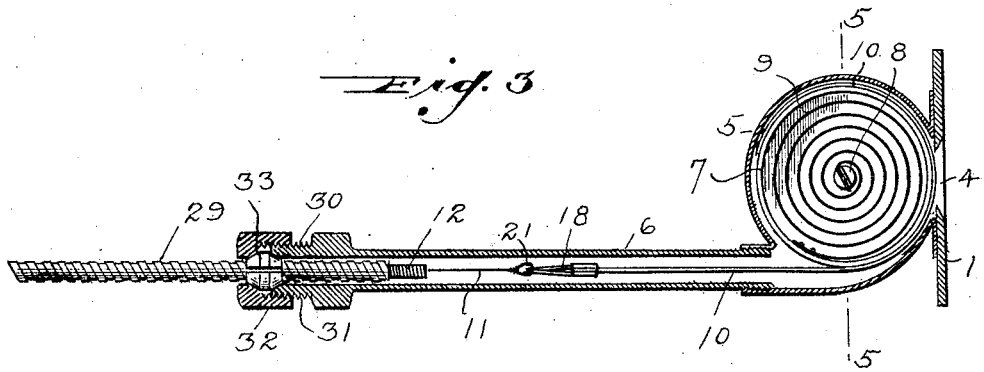
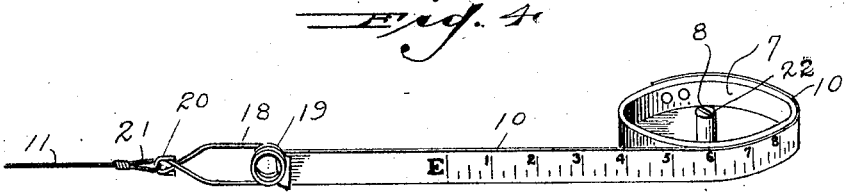
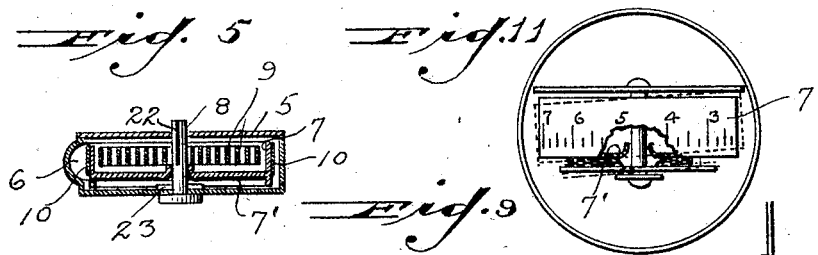
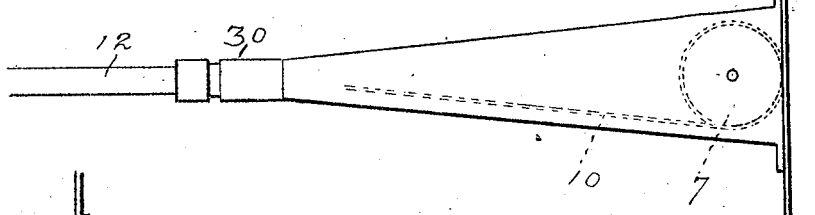
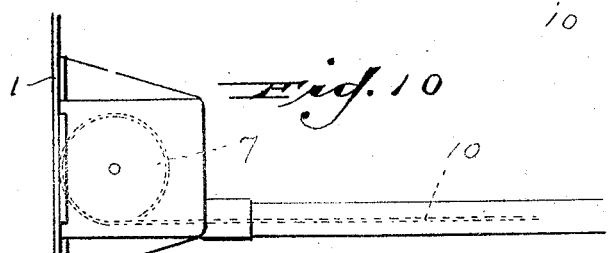

1,585,884

UNITED STATES PATENT OFFICE.

WILLIAM S. ADAMS, OF SAN DIEGO, CALIFORNIA, ASSIGNOR TO THE GROLAN MANUFACTURING COMPANY, OF DAYTON, OHIO, A CORPORATION OF DELAWARE.

FLUID GAUGE.

Application filed March 20, 1923. Serial No. 626,267.

My invention relates to measuring instruments and more particularly to a liquid gauge of the float operated type having distance indicating means by which fluctuations of the liquid level within a tank or container may be indicated at a distant point in units of quantity or proportional parts.

The invention is especially applicable to motor vehicles for indicating upon the dash or cowl board of the vehicle or elsewhere within the normal range of view of the driver a quantity or proportion of fuel remaining in the supply tank or reservoir, which may be located at the rear of the vehicle or in other positions beyond the vision of the driver. However, the invention is not limited to this application alone, but may be utilized in stationary installations for measuring and indicating the quantity of contents of tanks for various purposes or may be utilized as a ullage device for measuring the wantage or deficiency of casks or other containers and for calibrating receptacles.

Whereas formerly it was the practice to mount each instrument or indicator independently upon the dash or cowl board of a vehicle each instrument being provided with its own individual face plate, it is rapidly becoming the practice at the present time to group such instruments or gauges in association with a single display panel or face plate common to a number of such instruments or gauges. Such grouping of various instruments necessitates such indicators or gauges being constructed in small or compact form in order that they may be closely associated one to another to enable the use of a display panel or face plate of comparatively small size. The present construction contemplates a gauge head of a comparatively thin flat or disc like form, arranged to afford readings of measurement upon its peripheral edge. That is to say, the thin or disc like form of gauge head is arranged with its peripheral edge presented to view. In the present instance it has been illustrated as located intermediate two circular faced gauges or indicators of the usual type, where it economizes space by permitting the round faced indicators to be arranged in their usual spaced relation upon the display panel or face plate, while the present gauge occupies the intermediate space which would otherwise be wasted. Thus the gauge head is not only small or compact in itself, but it enables a small or compact grouping of a series of instruments.

The present invention contemplates a float controlled actuator which may be of any suitable or well known type, having operative engagement with a reciprocatory flexible transmission strand or wire, by which fluctuations of the float are transmitted through a curvilinear path of travel from the tank to the cowl board or other indicating position, where the varying degrees of to and fro movement of such transmission member are translated into units of liquid measurement by the herein described gauge. The particular form of gauge involves a rotary drum or guide wheel, preferably though not necessarily spring actuated, about the periphery of which extends a flat flexible tape or strap, having thereon a succession of graduations or characters indicative of units or liquid measurement, or proportional contents of the tank. This flexible tape is connected at its free end to the reciprocatory motion transmitting strand or wire, so that upon each fluctuation of the float within the tank the flexible tape is reeled on the drum or unreeled therefrom to a proportionate extent thereby presenting the corresponding graduations or measurement indication in observation position, which in this instance is in registry with an observation opening in the display panel or mask. While such indications have heretofore been displayed upon the periphery of a rotary drum or wheel, actuated by means of a cable or chain passing over a grooved pulley connected with such indicator drum. The present construction is designed to reduce the number of parts and afford a more compact construction by utilizing a flexible tape passing about the drum as the character bearing indicator.

The object of the invention is to simplify the structure as well as the means and mode of operation of such gauges and indicator heads whereby they will not only be cheapened in construction, but will be more efficient in use, accurate, uniform in action, durable and unlikely to get out of repair.

A further object of the invention is to provide a form of indicator head or gauge member, capable of being combined with other standard gauge or indicator heads in a compact grouping or association facilitating the use of a display panel of minimum size, common to all the instruments of such group.

A further object of the invention is to provide an improved form of indicator head and housing therefor, in which the extensible flexible indicating tape will be wholly enclosed in all positions of adjustment of the head.

A further object of the invention is to provide improved means for winding the retracting spring of the indicator head or drum, by which such spring may be variably tensioned and held in its adjusted condition.

A further object of the invention is to provide improved means for interconnecting the end of such flexible indicator tape, with the extremity of the motion transmitting strand or wire and to also provide improved means for adjustably connecting the housing or casing of such indicator head, with the tubular enclosure of the power transmission strand, whereby said parts may be relatively adjusted to synchronize the indicator head with the actuating float and to secure such parts in such adjusted relation.

With the above primary and other incidental objects in view as will more fully appear in the specification the invention consists of the features of construction, the parts and combinations thereof, and the mode of operation or their equivalents as hereinafter described and set forth in the claims.

In the accompanying drawings, wherein is shown the preferred, but obviously not necessarily the only form of embodiment of the invention, Fig. 1 is a front or face view of a display panel for a group of gauge instruments, including the particular form of gauge or indicator head, forming the subject matter hereof. Fig. 2 is a general view partially in perspective, illustrating the assembled gauge mechanism, and showing the indicator head housing viewed from the rear of the display panel or multiple gauge face plate. Fig. 3 is a plan view of the assembled gauge or indicator head, the housing being in section. Fig. 4 is a detail perspective view of the indicator parts removed from the housing. Fig. 5 is a transverse sectional view on line 5—5 of Fig. 3. Fig. 6 is a top plan view of a portion of the housing, showing the key hole slot for the reception of the drum shaft having spring winding features. Fig. 7 is a perspective view of the drum shaft removed from the housing. Fig. 8 is a detail view of the coupling member for interconnecting the free end of the indicator tape with the extremity of the motion transmitting strand or wire. Figs. 9 and 10 are plan views of modifications of the indicator housing. Fig. 11 is a detail view of the flexible drum mounting applied to a cylindrical head or housing and operated by a pulley chain or cable.

Like parts are indicated by similar characters of reference throughout the several views.

Referring to the drawings, 1 is a display panel or face plate common to a plurality of instruments as shown at 2 and 3. The indications of the present indicator head are visible through the intermediate observation space 4. In the preferred form of device, the indicating devices are enclosed in a flat circular housing 5, secured to the rear side of the panel 1, with an opening in the periphery of such housing in registry with the observation space 4. Extending rearwardly in substantially tangential relation with the housing or casing 5 is a fixed inflexible tubular arm or extension 6. Located within the circular head 5 is a revoluble drum or reel 7, mounted upon a central shaft 8 and spring actuated by means of a spiral spring 9 to normally retract a flat strap or tape 10. This strap or tape 10 is attached at one end to the periphery of the drum or reel 7, from which it may be withdrawn or unreeled against the tension of the retracting spring 9. The outer face of the tape 10 carries thereon a series of graduations or indication marks and characters indicative of units of liquid measurement or proportional part of the tank or reservoir, the contents of which are gauged. In order to actuate the drum 7 and tape 10 in accordance with fluctuations of the liquid level within the tank, the free end of the tape 10 is attached to the extremity of a flexible wire strand or cable 11, extending from the tank unit or float controlled actuator to the indicator head through a tubular enclosure or casing 12, and serving to transmit the fluctuation impulses to the indicator head through either straight or curvilinear paths. Any suitable form of float controlled actuating means may be employed. For instance, the transmission strand or wire 11 may be directly connected to a vertically movable float as has been common heretofore in gauges of this general class. The tank unit or float controlled actuator per se forms no part of the present invention. For illustration, however, there has been shown a type of tank unit or float controlled actuator similar to that disclosed in my prior Patent No. 1,355,939 of October 19, 1920. In this construction there is provided a hanger member 13, the head of which is secured to the top of the tank or reservoir, while the pendant portion projects within the tank, and supports a pivotally mounted float arm 14. This float arm 14 carries at its extremity a float 15, and connected to the float arm 14 in a medial position is a reciprocatory rod 16, having telescopic relation with a guide tube 17, which forms a continuation of the tubular enclosure 12 of the transmission member. The reciprocatory rod 16 is connected at its upper end to the reciprocatory transmission strand or wire 11, so that this member 11 responds to the rise and fall of the float within the tank. The particular form of indicator head forming the subject matter hereof, is not dependent upon this type of float controlled actuator but any other form of tank unit which will transmit to the member 11, reciprocatory movement in one or both directions may be employed. The transmission member 11 is detachably connected with the tape 10 by any suitable means. However, in the drawing, there has been shown a particular form of wire coupling, which is simple, cheap and effective. This coupling 18 comprises a length of spring wire medially coiled to afford several helical turns 19 between which the free end of the tape 10 is clamped. This end of the tape is preferably drawn between two of such coils in one direction and then reversed and drawn in the other direction between two succeeding coils. The free ends of the wire coupling are extended laterally from such coil 19, and are provided at their extremity with oppositely disposed hooks or turns 20, both of which engage an eye 21 in the end of the transmission member 11. These hook members 20 extend in opposite directions through the eye 21, and in overlapping relation with each other as shown more particularly in Fig. 8. The spring 9 of the revoluble drum is attached at one end to the peripheral wall of the drum with its inner end engaged with the shaft 8. To detachably engage the spring with the shaft so that the shaft may be removed to afford access to the parts, the shaft 8 is longitudinally slotted or bifurcated as at 22. This bifurcated end of the shaft straddles the end of the spring 9 and as the shaft is rotated such spring is wound or tensioned within the drum. In order to lock the shaft against reverse rotation and to hold the spring under the desired tension, the shaft 8 is provided with a lateral projecting stud or pin 23, which engages a stop lug or stud 24, projecting within the housing 5, in approximate relation to the bearing opening 26, in the head of said housing which receives the shaft 8. This opening 26 is provided with a lateral notch 27 forming with the opening 26 a key hole slot to permit the insertion of the projecting stud 23 of the shaft 8. This notch or slot 27 is out of alinement with the stop stud or lug 24, so that the engagement of the projection 23 with such stop stud or lug not only holds the shaft against reverse rotation, under the influence of the tensioned spring, but also prevents the withdrawal of the shaft from the housing until the shaft has been rotated to bring the projection 23 into registry with the notch of the key hole slot.

In practice it is the custom to enclose the transmission wire or strand 11 loosely within a tubular conduit or guide comprising a closely wound helical wire spring 12. This enclosure however, may be a small section of metallic tubing or other suitable carrying tube. To afford increased protection and for other reasons, it has been found desirable to inclose such guide tube or closure 12 within a flexible armour or conduit 29. This protective tubular conduit or if the outer protective closure is omitted the guide conduit 12 is fixedly connected with the indicator head by means of a suitable clamping terminal 30. In order that the indicator head may be synchronized to the float within the tank so that the indication carried by the tape 10 will correctly disclose the quantity of contents of the tank as determined by the level of the float, it is necessary that the housing or tubular guide connection with the indicator housing shall be adjustable. That is, by adjusting the indicator housing to and fro in relation with the tubular guide conduit of the transmission wire without changing the length of the transmission wire, the tape 10 is caused to reel or unreel until the indication corresponding to the relative positions of the float is brought to the observation point. The connection 30 is then adjusted to fixedly join the tubular guide housing and the indicator head. In the present instance, the indicator head has been shown provided with a screw threaded extremity 31 upon the end of the tubular arm 6, which head has a counter bored or tapered orifice. This head is engaged by a nut 32, the orifice of which is similarly counterbored in opposition to that of the head 31. The guide tube for the transmission wire is surrounded by a split collar 33, the opposite extremities of which are tapered to agree with the tapered counterbore of the head 31 and nut 32. By the adjustment of the nut 32, this split collar 33 is contracted about the guide conduit and simultaneously clamped between the nut 32 and head 31 to hold the several parts in relatively adjusted positions.

From the construction heretofore described, it will be apparent that as the float 15 rises and falls within the tank, its motion will be communicated through the intermediate transmission member 11 to the indicator head to cause the tape to be correspondingly extended or retracted. That is to say, the pull of the transmission member 11 upon the tape will cause the tape to be unreeled from the drum 7, against the tension of the retracting spring 9, whereas upon reverse movement of the transmission member 11, the tape will be retrieved by the retraction spring 9. This to and fro movement of the tape successively presents at the observation space 4 the graduations or characters of measurement indicative of the corresponding fluid level within the tank as determined by the position of the float.

In lieu of the circular housing or casing 5 with its tangentially extending tubular arm 6, the indicator housing may be of elongated triangular form, or wedge shape as shown in Fig. 9, or such housing may be of substantially rectangular form with a rearwardly extending tubular arm as shown in Fig. 10.

The loose journaling of the drum or reel 7 upon the stationary shaft 8 not only facilitates the adjustment or winding of the spring to desired tension, but it enables the drum to be self adjusting to maintain it in its proper place of rotation. Such gauges are subject to abuse, and do not always receive the care and treatment to be accorded instruments of precision. Consequently when the drum is fixedly attached to a revoluble shaft, as has heretofore been the usual practice, any deflection of bending of the drum out of its normal plane caused the drum to rub upon the mounting or frictionally engage the shaft mounting or the housing, and so prevent free oscillation. In extreme cases the drum or reel sometimes became locked. To overcome this difficulty and to reduce the cost of manufacture, the web 7' of the drum is preferably provided with a simple hole to receive the shaft or such hole may be breached to reduce the cutting action of the edge of the hole upon the shaft. In any event the bearing upon the shaft is not only loose or "sloppy" but it is also narrow or short whereby the drum or reel is permitted a considerable degree of deflection or tilting movement in relation with its normal plane of oscillation, independent of the shaft. By being loose and wobbly upon the shaft, the drum may yield or accommodate itself to any lateral pressure or displacement without incurring a permanent set, as is the case when fixedly secured upon the shaft. In the present instance, the whole drum or reel may "come and go" without bending or straining the web or spokes of the drum. However, such deflection or tilting movement is limited by a guide plate arranged in juxtaposition to the drum and parallel with its normal plane of oscillation. In the construction shown the guide plate comprises the head of the casing or housing 5. It might, however, be a separate plate fixedly mounted in a plane substantially perpendicular to the axis of the shaft. Such guide plate or housing head forms a limiting stop for the drum. However, when thrust against such guide plate or stop, the drum does not remain in such assumed position and rub upon the plate as is the case when the drum is fixed upon its trunnion shaft, but it is free to right itself when the deflecting pressure is removed.

This construction is also applicable to the type of indicator drums now in common use wherein the indications are carried upon the periphery of the drum and the drum oscillated by means of a flexible cable or chain connected with the transmission wire and passing to a grooved pulley. Such construction has been shown in Fig. 11 wherein the drum is shown enclosed in a cylindrical head or housing.

From the above description it will be apparent that there is thus provided a device of the character described possessing the particular features of advantage before enumerated as desirable, but which obviously is susceptible of modification in its form, proportions, detail construction and arrangements of parts without departing from the principle involved or sacrificing any of its advantages.

While in order to comply with the statute the invention has been described in language more or less specific as to structural features, it is to be understood that the invention is not limited to the specific details shown, but that the means and construction herein disclosed comprises the preferred form of several modes of putting the invention into effect and the invention is therefore claimed in any of its forms or modifications within the legitimate and valid scope of the appended claims.

Having thus described my invention, I claim:

1. In a liquid gauge, a float controlled indicator including a revoluble drum, an actuating spring for said drum, an independently revoluble trunnion shaft for said drum to which one end of the spring is connected, the opposite end of the spring being connected to the drum, a housing for said drum in which the shaft is mounted, one of the shaft bearings in said housing having a radial notch, said shaft having a radial enlargement adapted to pass through said notch into the interior of the housing, and a stop projection within the housing in spaced relation with said notch against which the radial enlargement engages under influence of the spring and out of registry with the entrance notch to detachably lock the shaft against rotation.

2. In a liquid gauge, a float controlled indicator including a revoluble drum, an actuating spring therefor, a revoluble shaft for said drum with which the spring is engaged and by the rotation of which the spring is tensioned, a housing for the drum having a key hole slot to receive one end of said shaft, a projection upon the shaft passable into the housing through said key hole slot, and a stop within the housing with which the projection is engageable under influence of the spring in a position out of registry with the key hole slot to retain the shaft in adjusted position and the spring under tension.

3. In a liquid gauge, a float controlled indicator including a revoluble drum, an actuating spring therefor, a bifurcated revoluble shaft for said drum, the bifurcated extremity of which is adapted to straddle the spring to afford detachable engagement therewith, a housing for said drum and spring in which the shaft is mounted for relative longitudinal and rotary movement, and interengaging means between the shaft and housing for detachably locking the shaft in adjusted position with the spring under tension afforded by the rotation of the shaft.

In testimony whereof, I have hereunto set my hand this 12th day of March, A. D. 1923.

WILLIAM S. ADAMS.